US012338080B2

United States Patent
Joachim (10) Patent No.: US 12,338,080 B2
(45) Date of Patent: Jun. 24, 2025

(54) DEFLECTION DEVICE

(71) Applicant: Wipotec GmbH, Kaiserslautern (DE)

(72) Inventor: Matthias Joachim, Pirmasens (DE)

(73) Assignee: Wipotec GmbH, Kaiserslautern (DE)

( * ) Notice: Subject to any disclaimer, the term of this patent is extended or adjusted under 35 U.S.C. 154(b) by 31 days.

(21) Appl. No.: 18/376,828

(22) Filed: Oct. 4, 2023

(65) Prior Publication Data

US 2024/0228187 A1 Jul. 11, 2024

(30) Foreign Application Priority Data

Oct. 7, 2022 (DE) ...................... 20 2022 105 673.0

(51) Int. Cl.
*B65G 47/76* (2006.01)
*B65G 47/82* (2006.01)

(52) U.S. Cl.
CPC ........... *B65G 47/766* (2013.01); *B65G 47/82* (2013.01)

(58) Field of Classification Search
CPC .............................. B65G 47/766; B65G 47/82
USPC ................... 198/456, 457.07, 370.07
See application file for complete search history.

(56) References Cited

U.S. PATENT DOCUMENTS

| | | | |
|---|---|---|---|
| 3,955,678 A * | 5/1976 | Moyer | B65G 47/50 |
| | | | 209/583 |
| 4,986,407 A | 1/1991 | Heuft | |
| 6,588,575 B1 | 7/2003 | Heuft | |
| 9,550,632 B2 * | 1/2017 | Winkler | B65G 47/71 |
| 2007/0209906 A1 * | 9/2007 | Ranger | B65G 47/82 |
| | | | 198/370.07 |
| 2015/0274439 A1 * | 10/2015 | Goudy | B07C 3/06 |
| | | | 198/367 |

FOREIGN PATENT DOCUMENTS

| | | | |
|---|---|---|---|
| DE | 3711605 A1 * | 10/1988 | .......... B65G 47/766 |
| DE | 10 2021 125 919 A1 | 4/2023 | |

* cited by examiner

*Primary Examiner* — James R Bidwell
(74) *Attorney, Agent, or Firm* — Calvert Technology Law, PLLC; Nathan H. Calvert (57) ABSTRACT

A modular deflection device comprises a housing and at least two steering elements for applying a steering action on discrete products moving along a conveyor plane. Each steering element has a swivel section formed about a swivel axis with an associated steering section. A drive with a drive element is provided in the housing for each steering element, each drive element being coupled or capable of being coupled to the swivel section of the associated steering element in such a way that the steering element is set into a swivelling movement about the swivel axis by an advancing movement of the drive element. The steering elements are arranged with their swivel sections outside the housing and a section of each drive element can be pushed in an advancing movement along a straight advancing direction with respect to the housing through its own passage opening leading out of the housing.

20 Claims, 4 Drawing Sheets

DEFLECTION DEVICE

TECHNICAL FIELD OF THE INVENTION

The present invention relates to modular deflection devices that facilitate the deflection of products from one track to another track.

BACKGROUND OF THE INVENTION

Deflection devices that operate to deflect products from one track of movement to another are known from the industrial handling of products. For example, products lying on a conveyor belt and transported there are sorted by a steering element acting on them laterally when certain criteria are met, in order to selectively push the products onto another track along the conveyor belt or even off the conveyor belt. Elements which can be swivelled and/or movable elements that can be actuated by pneumatic or electrically operated actuators can be used as steering elements. They can be moved into the track of the approaching product in order to steer it out of the track on contact. A product may alternatively be impacted laterally by the steering element in order to push it out of its track and preferably off the conveyor belt.

The known deflection devices can comprise one or more steering elements, each of which is actuated by an associated actuator (for example a pneumatic cylinder) in order to be moved from a ready position to a working position and back. The ready position should be defined in such a way that the steering element does not act on a product in this position. In the working position, however, the product is moved to another track or even off the conveyor belt by contact with the steering element.

Special requirements apply here for the processing of foodstuffs that have to be transported and sorted under special hygiene requirements. In particular, this concerns the transport of unsealed packaging with food products already contained therein, for example filled jars that have not yet been sealed with a lid, so that the product must be safely protected from contamination during transport.

Finally, the deflection device must be cleaned regularly. This can be done, for example, by steam jetting, wherein contact of water with sensitive components of the deflection device (especially the actuators moving the steering elements) should be avoided as far as possible. Therefore, a housing is often provided which separates these sensitive components from the environment to a large extent. However, since the steering elements must be arranged outside the housing in order to be able to interact with the products, a movable drive element must be provided which establishes a mechanical connection from the actuators inside the housing to the steering elements outside the housing. This movable drive element projects through a housing opening for purpose of establishing the mechanical connection to the steering elements. A housing opening common to all steering elements can be used for allowing drive elements to project from the housing, but such a common housing opening is then comparatively large and difficult to seal against the penetration of substances during cleaning. Alternatively, a separate housing opening can be provided for each steering element. However, the sealing of these openings also causes considerable difficulties in practice, as is known from the state of the art.

SUMMARY OF THE INVENTION

It is an object of the invention to provide a deflection device which overcomes the aforementioned disadvantages and others associated with prior deflection devices.

Figure 4:
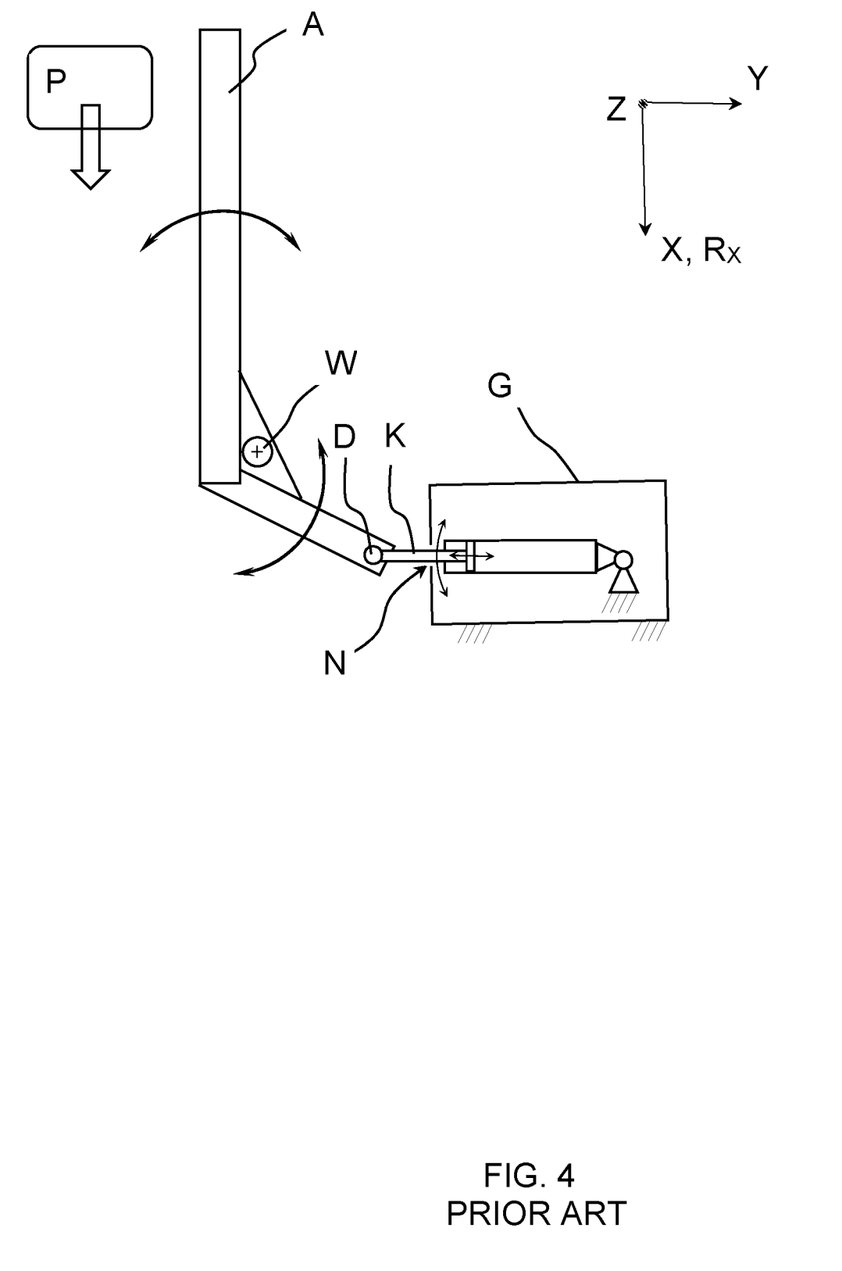
FIG. 4 is a representation of a prior art steering element and drive.

According to one aspect of the invention, a separate drive element for each steering element is pushed through a separate passage opening leading out of the housing in a translatory advancing movement, preferably along a straight (linear) advancing direction. In the state of the art, on the other hand, the steering elements are often moved with the aid of pneumatic cylinders whose piston rods (as drive elements) each protrude through a housing opening and engage directly with the respective steering element at their free end. The point of engagement D is at a distance from a swivel axis of the steering element, so that the end of the piston rod moves on a circular path during the transition from the ready position to the working position. FIG. 4 shows such a prior art arrangement. Thus the common axis of the piston and cylinder is also swivelled so that the piston rod in these prior art arrangements not only moves back and forth through the housing opening during the advance, but also transversely to a degree. The housing opening must allow this transverse play, which makes the housing opening difficult to seal.

The solution according to the invention, on the other hand, ensures a particularly good (preferably hermetic) sealing of the housing in that the drive elements acting on the steering elements can each be moved along a straight advancing direction through their own passage opening in the housing. According to the invention, there should be no simultaneous movement of the drive element orthogonally to the advancing direction. As the drive element extends or advances from the housing, the cross-section of the drive element located in the passage opening preferably remains constant. Since the drive element—in contrast to the state of the art—performs its advancing movement exclusively in the direction of its longitudinal axis, it is admissible to arrange a seal surrounding the drive element on or in the passage opening, which in turn does not have to allow any deformation transverse to the advancing direction. The seal can fit tightly against the housing and the drive element and seal the housing particularly well.

A modular deflection device according to the invention comprises at least two steering elements for steering discrete products moving along a conveyor plane. Each steering element has a swivel section formed around a swivel axis, which is connected to a steering section adjoining the swivel section. The steering section is designed for steering the product to be sorted.

Such a deflection device is also provided with a housing which extends in a longitudinal direction X, a transverse direction Y orthogonal thereto and a vertical direction Z orthogonal to both directions X, Y. This position in which the direction Z extends vertically represents an operating position of the deflection device. The housing defines a housing volume in which is provided a drive for each steering element. Each drive is adapted to drive a respective displaceable drive element. The drive is rigidly mounted relative to the housing and/or stationary relative to a structure supporting the housing and connected to the supporting surface for the system. In some implementations, the drive itself cannot swivel. For example, the drive may be a pneumatic cylinder rigidly mounted in the housing, the drive element being formed by a piston rod or push rod coupled to a piston of the cylinder. According to the invention, a section of the drive element (preferably the entire drive element) moves in a straight direction relative to the housing as the drive element advances from the housing, i.e. without changing its position in space or in relation to the housing. In particular, the drive element does not swivel relative to the housing during the advancing movement (or also during the opposite movement), but performs a purely translatory back and forth movement.

Each drive element is coupled or can be coupled to the swivel section of the associated steering element in such a way that the steering element performs a swivel movement about the swivel axis during an advancing movement of the drive element.

According to the invention, the steering elements with their swivel sections are arranged outside the housing. Each drive element or at least a section thereof can be pushed through the respective housing opening in the manner described above along a straight advancing direction.

Embodiments of the invention facilitate a well-sealed passage opening in the housing which, with the drive element guided through the passage opening, simultaneously allows a mechanical connection between the drive arranged in the housing and the steering element arranged outside the housing.

A deflection device according to embodiments of the invention makes it possible to seal the housing at the respective passage opening against the uncontrolled penetration of undesired substances independently of the swivelling position of the associated steering element. Unlike in the prior art, where a piston rod or drive element coupled to the steering element is also (slightly) swivelled during its advance (that is, extension) from the housing, this swivelling of the piston rod does not happen in designs according to the invention, so that the sealing effect can be maintained equally well for each position of the steering element. As a result, protection classes in accordance with European Ingress Protection Code DIN EN 60529, for example, ingress protection ratings can be achieved for the housing openings.

In implementations of a deflection device according to the present invention, the sealing element acting on the passage opening preferably has an annular or cylindrical shape. The passage opening in the housing may be circular for the purpose of receiving such an annular or cylindrical sealing element, and the drive element guided through the passage opening also preferably has a circular cross-section at least along that section that traverses the passage opening throughout the range of movement of the drive element for extension and retraction. An annular seal, which is located in the radial direction between the drive element and the housing in the passage opening, can thus seal the housing particularly well.

According to some embodiments of a deflection device in accordance with the invention, the passage openings are mounted in an underside of the housing so that the drive elements move downwards out of the housing as the drive elements are extended. This positioning of the passage openings provides additional security against the unintentional penetration or seepage of cleaning fluid into the housing. Furthermore, this positioning of the passage openings in the underside of the housing ensures that any medium (e.g. flushing air) leaving the housing through the openings leaves the housing in a defined direction downwardly. This means that products to be protected from contamination can be conveyed or otherwise processed outside this direction without being contaminated by the escaping medium or foreign substances carried therein.

The direction of advance or extension along which the drive elements can be moved back and forth may, for example, run parallel to the vertical direction Z. Embodiments of a deflection device in accordance with the present invention may also align the swivel axes of the steering elements parallel to the longitudinal direction X. It is also preferable that the advance or extension direction is orthogonal to the swivel axis of the steering elements or that the respective passage opening for at least two, preferably all, drive elements lies in an X-Y plane. For example, on its underside of the housing, which can extend in a horizontal X-Y plane, the housing can have several passage openings, preferably lying next to each other in one direction, each of which is penetrated in the Z-direction by an associated drive element.

Implementations of a deflection device in accordance with the present invention may include a swivel axis common to all steering elements. Each steering element can be swivelled individually by its associated drive from a ready position to a working position and back. A common swivel axis simplifies the design of the deflection device. In addition, the common swivel axis helps make it possible to arrange the individual steering elements in close proximity to each other on the swivel axis.

Preferably, the steering section of one, several or all steering elements in the ready position extends orthogonally to its orientation in the working position, so that the steering section swivels from one position to the other by 90°. In some implementations, steering section extends in vertical direction Z in the ready position and/or in transverse direction Y in the working position.

Guiding the drive element along a straight advance/extension direction through the passage openings of the housing can be accomplished particularly well with a design of the steering element specially provided for this purpose. For example, the drive element may have a coupling element which can be coupled or is coupled to the respective swivel section of the steering element outside the housing for transmitting the advancing/extension movement and converting that advancing/extension movement of the drive element into a swivel movement of the steering element. Such a coupling may take place at an engagement point which, according to the invention, does not change its position in the Z-direction and/or in an X-Y plane during the advance/extension of the drive element. The point of engagement may move along the coupling element and the swivel section during the advance/extension of the drive element, as will be seen in more detail in the examples of the figures. In contrast, it can be seen from FIG. 4 that the point of application D in the prior art changes its position in space during the advance/extension of the coupling element and the drive element K connected to it, thereby moving on an arc around the swivel axis W of the steering element. In this prior art case, the passage opening N in the housing cannot be sealed satisfactorily due to the longitudinal axis of the piston rod or the drive element K also swivelling slightly. On the contrary, the piston rod does not swivel in implementations of the invention where the point of contact remains essentially stationary during the advance/extension of the piston rod.

Some embodiments of a deflection device according to the invention employ a coupling element comprising a toothed rack and a corresponding swivel element comprising a toothed wheel profile formed around the swivel axis. In this arrangement the toothed rack is displaced in a straight direction during the advance/extension, while the toothed wheel profile of the swivel element, which meshes with the toothed rack, rolls against it and thereby swivels the steering element.

One or more steering elements may be preloaded, for example, spring-loaded, to assume the working position or the ready position. Either the advancing/extension movement or an opposing retracting movement of the drive element then takes place against the pretension in such a way that, in the event of a drive failure, the steering element automatically assumes the position caused by the pretension. This preloading of steering elements can contribute to the operational safety of the deflection device in that, for example, all steering elements are pretensioned to assume the ready position, and the advance/extension of the respective associated drive element must take place against this pretension in order to move the steering element into the working position. In the working position, the steering section of the steering element preferably extends towards the conveyed product and is positioned, for example, just above the conveying device. In the event of a failure of the respective drive or of the entire deflection device, all steering elements would be swivelled out of the track of the products back into the ready position in order to enable the undisturbed further transport of the products.

Embodiments of a defection device in accordance with the present invention may combine the steering elements into a common assembly which can be detached as a module from the remainder of the deflection device for replacement or maintenance purposes. In particular, such a modular assembly can include a swivel axle common to all steering elements as well as the steering elements mounted on the swivel axle. The drive elements protruding through the housing (and any coupling elements connected thereto) are preferably not part of this modular assembly. This modular arrangement makes it easy to replace individual steering elements or, depending on the application, to use differently dimensioned steering elements by removing the entire steering element assembly as a module and replacing it with an assembly with other steering elements. In such a modular steering element assembly the possibly different steering elements for coupling with the drive elements or their coupling elements should have a uniform coupling profile, for example a tooth profile with always the same pitch. When such a module is removed, the tooth profiles of the swivel section on the one hand and the coupling element on the other hand separate. Conversely, when such a module is inserted, the tooth profiles interlock again so that the new module is immediately ready for use. For attaching or detaching the module, the housing of the deflection device can have suitable receiving means which can preferably also be operated without tools. The individual steering elements can differ in particular in the length of their steering sections, wherein the length can vary both within a module and in comparison to other modules. The number and/or the individual width of individual steering elements of a module can also be freely selected, so that a module with a first number of steering elements can be replaced by a module with a different number of steering elements, for example, a module with six steering elements can be replaced by one with ten steering elements. The steering elements can be pushed one behind the other onto the common swivel axis. In doing so, it is only necessary to ensure that a suitable number of drives or drive elements protruding from the housing are available for the desired number of steering elements. Gaps between individual steering elements can also be deliberately built in using suitable spacers.

A deflection device according to the invention can be advantageously arranged on a conveyor device in order to sort the products conveyed by it. The conveyor device may convey products in at least one track, which leads over a conveyor plane in a conveying direction $R_X$. For example, the conveyor device may comprise a conveyor belt which defines the conveyor plane and on which the products rest during transport. A deflection device in accordance with aspect of the invention is situated adjacent to the conveyor device in such a way that at least one steering element of the deflection device is swivelled in its working position into the track of a conveyed product in order to deflect the product onto another track by contact with the steering element.

At its free end facing away from the swivel axis, each steering element may include an inclined or curved guiding edge which, in the working position, can interact with a conveyed product by moving the product against the guiding edge during conveying in conveying direction $R_X$ and— following the guiding edge profile—deflecting the product transversely to the guiding edge when the product is conveyed further.

Embodiments of the invention may include several steering elements with steering sections of different lengths to facilitate moving a product selectively on different tracks on the transport plane, each assigned to a steering element. In some implementations, several steering elements may be used together. For this purpose, steering elements with increasing length of their steering sections may be arranged one behind the other on the swivelling axis, as seen in the conveying direction X. Depending on the track from which an approaching product is to be diverted and the track into which it is to be diverted, the corresponding steering elements are to be swivelled into the working position, wherein adjacent steering sections for the product form a common guiding edge which acts laterally on the product while it is conveyed against and along this edge. In these implementations, the product is steered transversely to the conveying direction $R_X$ until it has passed the steering element with the longest steering section that has been swivelled into the working position.

Preferably, a deflecting device in accordance with the invention is located in such a way that the conveying direction $R_X$ runs parallel to the swivel axis and/or to the longitudinal direction X, and/or that the advancing/extension direction of the drive elements runs orthogonally to the conveyor plane, and/or that the passage openings for the individual drive elements lead out of an underside of the housing that is preferably parallel to the conveyor plane.

Where the passage openings are located on the underside of the housing, it is preferable for a conveyor belt forming the conveyor plane to be located so far to the side of the housing that any flushing medium escaping downwards from the passage openings cannot reach the conveyor belt and the products lying on it.

A flushing medium, in particular air, can be applied to the housing to help protect against condensation within the housing and/or to dry the interior of the housing. For this purpose, the flushing medium can be introduced into the housing through at least one supply connection and can flow out of the housing again through at least one discharge connection. The at least one discharge connection may be designed to allow the medium to flow out into the environment at the end of the outflow connection in a discharge direction that is perpendicular to the conveyor plane or away from the track of a product. This discharge arrangement ensures that flushing medium discharged from the housing cannot contaminate the product conveyed by the conveyor device.

In some embodiments the movement of the steering element between the ready position and the working position is effected by the coupling of two elements, one of which (preferably a coupling element) performs an exclusively translatory, preferably rectilinear movement for this purpose, while the second element (preferably a swivelling section of a steering element) coupled to this element performs an exclusively rotatory and planar swivelling movement.

These and other aspects, advantages, and features of the invention will be apparent from the following description of representative embodiments, considered along with the accompanying drawings.

DESCRIPTION OF REPRESENTATIVE EMBODIMENTS

Figure 1:
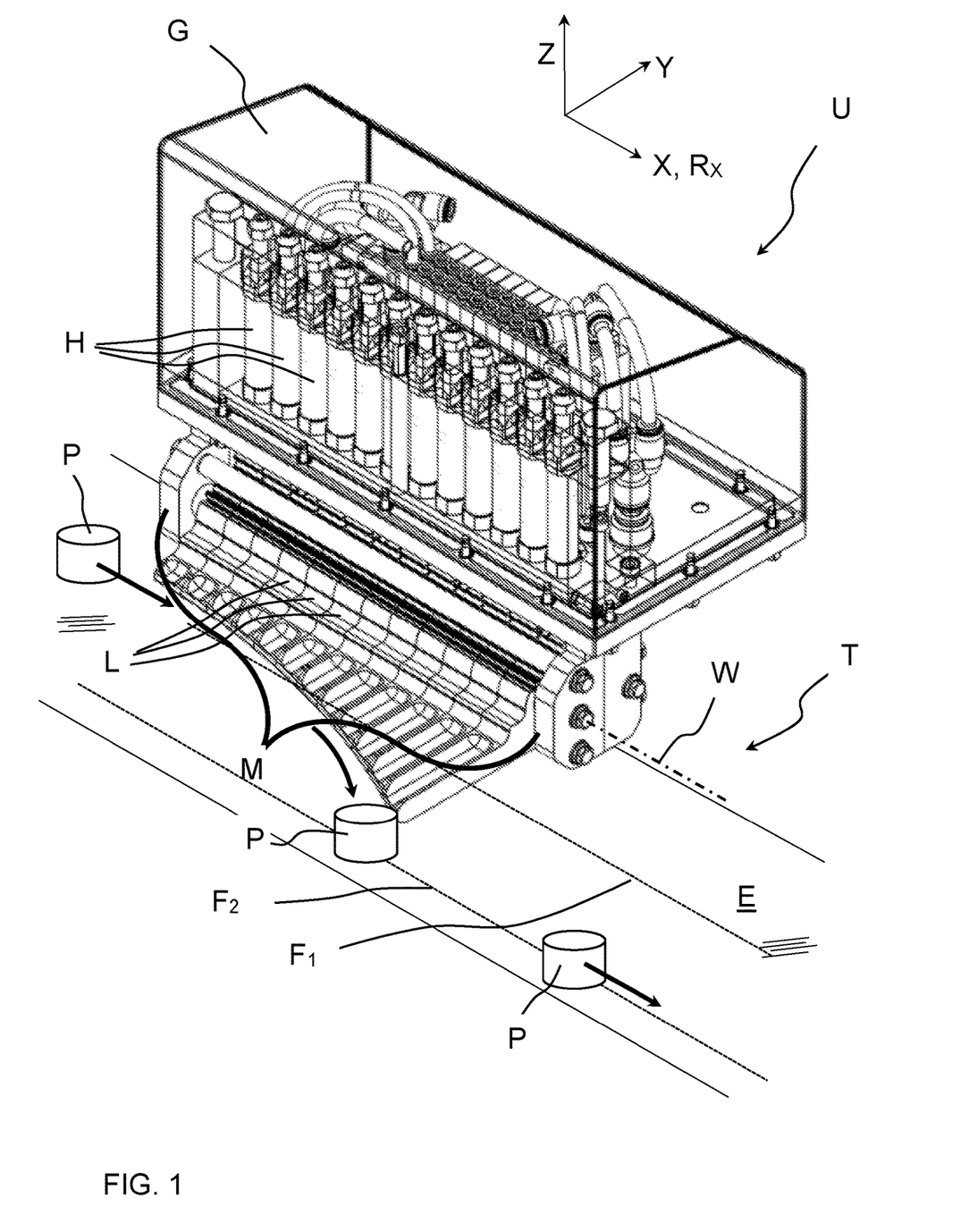
FIG. 1 is a perspective side view of an arrangement of a deflection device in accordance with the present invention on a conveyor device.

FIG. 1 shows an oblique perspective view of a deflection device U, which is arranged above and slightly offset to the side of a conveyor plane E of a conveyor device T. The deflection device U comprises a sealed housing G which, in the illustrated operating position, extends in a longitudinal direction X, a transverse direction Y orthogonal to it and a vertical direction Z orthogonal to both directions X and Y. The conveyor device T conveys products P in a conveying direction $R_X$, which runs parallel to the longitudinal direction X in this example. Within the housing G, several pneumatic cylinders are arranged one behind the other in the longitudinal direction X as drives H, some of which are called out by way of example. The individual pneumatic cylinders can be controlled for the advancing/extension or return stroke of the respective piston rod via a compressed air connection common to all drives (in this example) and suitable controllable distributor valves.

Below the housing G, a module M including several steering elements L is arranged on the housing, wherein only some of the steering elements L are called out in FIG. 1 by way of example. Each drive H is designed to swivel an associated steering element L from a ready position to a working position and back via a drive element in the form of a piston rod in this embodiment. The drive elements K, which are not shown in FIG. 1 but shown in the enlarged view of FIG. 3, extend through respective passage openings N (FIGS. 2 and 3) on the underside of the housing G in order to act on the steering elements L below the housing. In order to make replacement simple, the assembly with all steering elements L can be detached from the housing G as a module M.

The conveyor plane E is formed by the surface of an unspecified conveyor belt of the conveyor device T. The conveyor belt moves individual products P, which can be conveyed along the conveyor belt in different tracks. FIG. 1 shows a product P which is conveyed in a track $F_1$ to the deflecting device U. Through the action of some steering elements L of the module M, the product P is first deflected onto a second track $F_2$ running parallel to the first track $F_1$, and is then conveyed further along this second track. The products P being conveyed can thus be diverted to different tracks by selecting the respective steering elements L to be swivelled into the respective working position (FIG. 1 shows each steering element L in its respective working position). Depending on the width of the conveyor belt, it is also possible to steer a product completely off the conveyor belt, for example to sort it out as a defective product.

Figure 2:
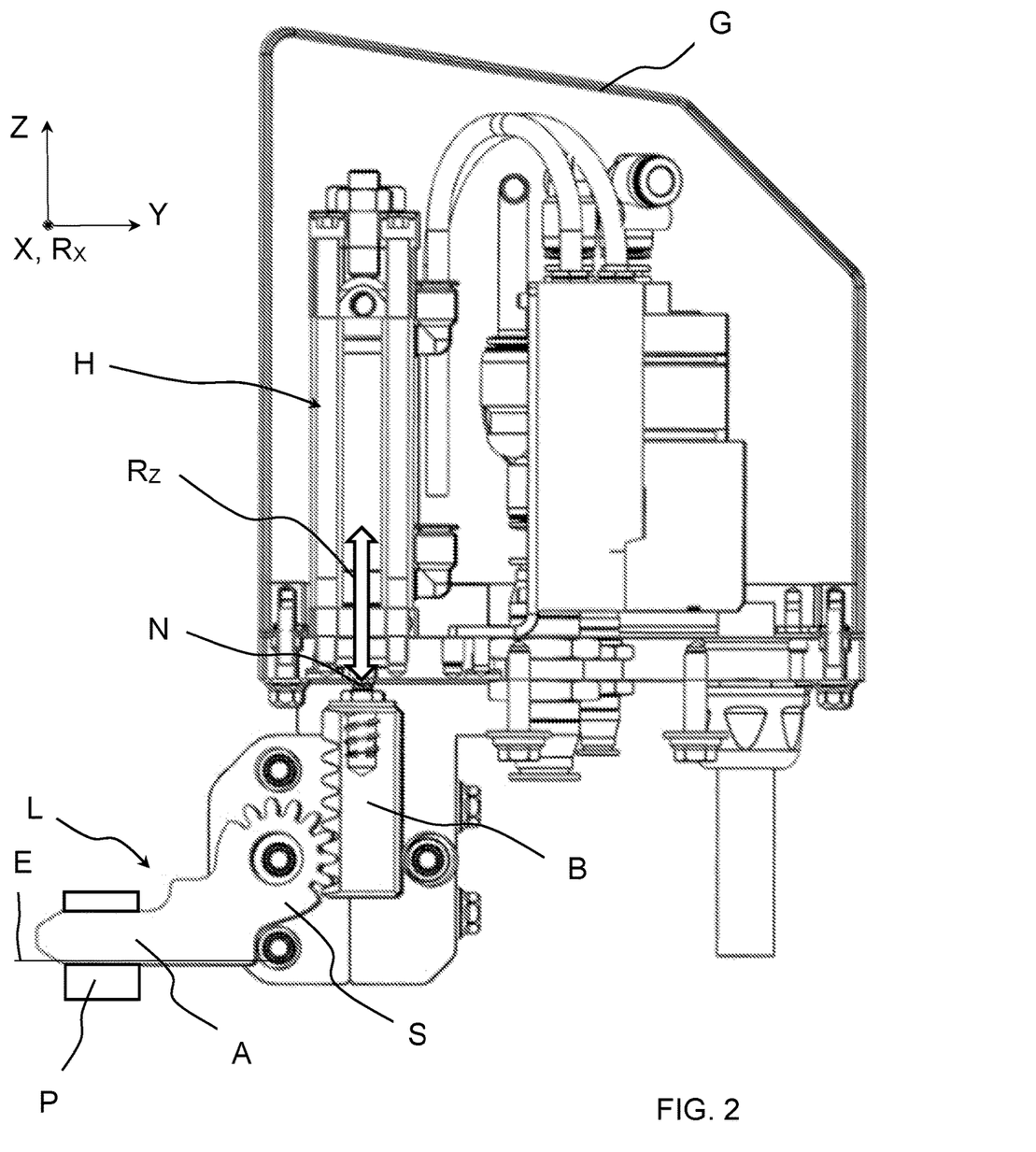
FIG. 2 is a schematic side view of the deflection device shown in FIG. 1.
Figure 3:
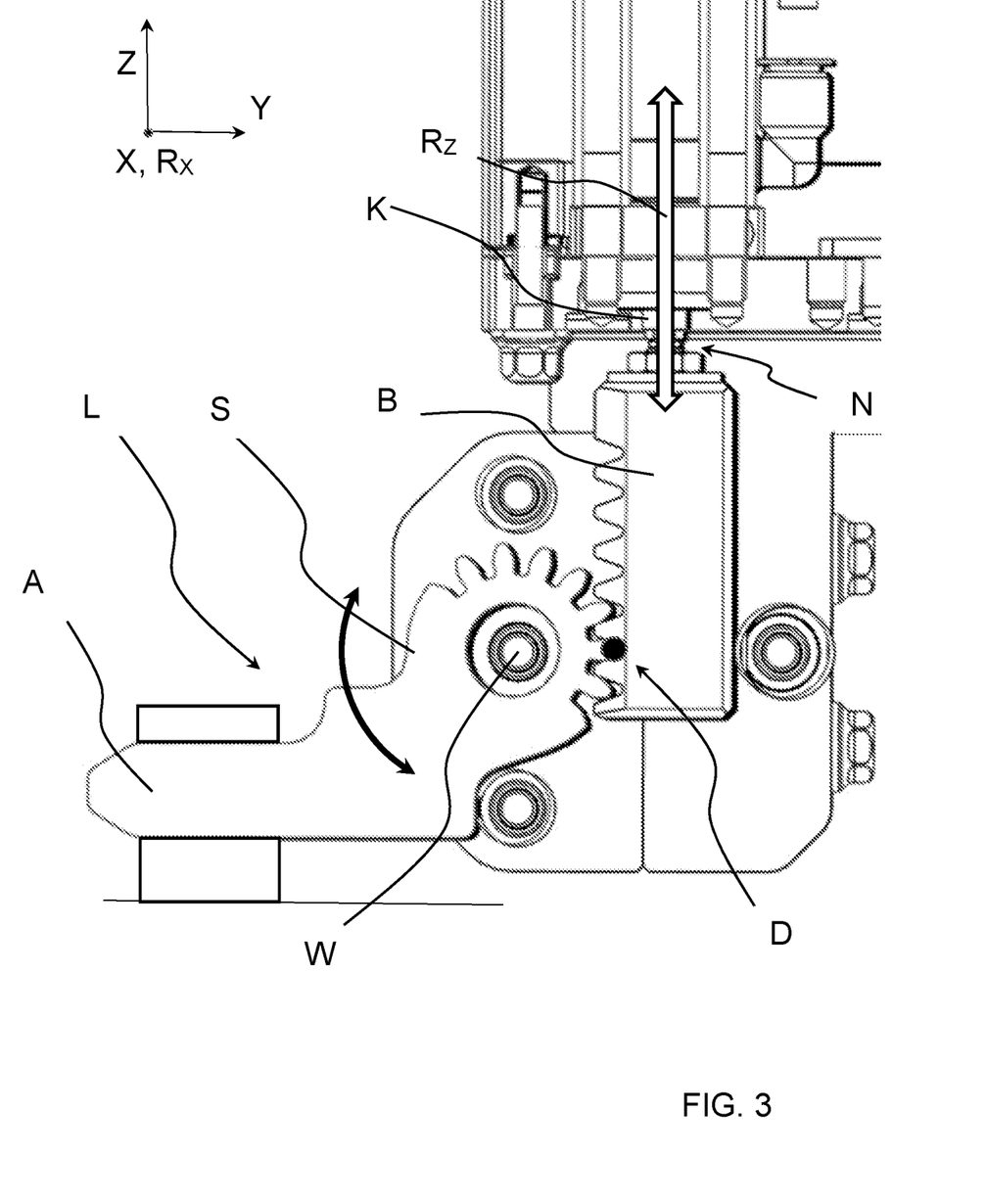
FIG. 3 is an enlarged detailed view from FIG. 2.

FIG. 2 shows a simplified schematic side view of a section through the deflection device looking in a direction perpendicular to the longitudinal direction X. Inside the housing G, one of the drives H can be seen as a pneumatic cylinder which can be supplied with compressed air via supply lines and valves that are not called out in the figure. The drive H is rigidly connected to the housing G and does not perform any swivelling movement relative to the housing during operation. A drive element K in the form of a piston rod, which is not directly visible in view of FIG. 2 but shown in the enlarged view of FIG. 3, is advanced (that is, extended) and retracted by the pneumatic cylinder/drive H through a passage opening N in the underside of the housing G along a drive element path in a straight advancing/extension direction $R_Z$ indicated by the arrow shown. At its lower end and outside the housing, the drive element K is connected to a coupling element B, which interacts with a swivel section S of the steering element L in order to convert the advancing/extension movement of the drive element K (FIG. 3) into a swivel movement of the steering element L. Adjacent to the swivel section S is a steering section A, which is provided for impacting and deflecting a product.

FIG. 2 shows the steering element L in its working position, in which the steering section A extends just above the conveyor plane E and approximately parallel to it. In this working position the steering section A lies in a track of a product P, which is to be steered out of this track in the transverse direction Y. With the aid of the drive H, the steering element L can be swivelled clockwise by approximately 90° from the working position shown into a ready position in which the steering section A extends approximately in the vertical direction Z. In this ready position (not shown), the steering elements L are retracted so as not to protrude into the tracks of the products P. Thus when the steering elements L are in the retracted, ready position the products P can be transported further along their tracks without hindrance.

FIG. 3 shows an enlarged section of FIG. 2. It can be seen how the piston rod as the drive element K extends through the passage opening N in the underside of the housing G and can be moved back and forth in the travel direction $R_Z$. The coupling element B connected to the drive element K comprises a straight toothed rack, the teeth of which mesh with a swivel section S of the steering element L formed as a toothed wheel section. By moving the drive element K back and forth, the coupling element B drives the steering element L to swivel about the swivel axis W in order to fold the steering section A connected to the swivel section S selectively down into the ready position (shown in FIG. 3) or up into the working position (not shown).

During the advance/extension of the steering element L from the ready position to the working position, the coupling element B engages the toothed wheel profile of the swivel section S via an engagement point D. Due to the linear advance movement of the drive element K with the coupling element B and its rolling movement on the swivel section S, the engagement point D does not change its position in space during the advance/extension of the steering element L and instead remains stationary. This has several advantages:

The swivel angle is directly linearly dependent on the advance position of the drive element K, unlike in the state of the art according to FIG. 4. Similarly, the swivel speed of the steering element L is directly linearly dependent on the advance speed of the drive element K.

The steering element L as part of the module M can be replaced particularly easily by removing the module M in or perpendicular to the transverse direction Y. In this way, the previously interlocking teeth of the coupling element B or of the swivel section S are easily disengaged without having to disengage any other coupling between the steering element L and the drive H. A new module to be used alternatively can be arranged on the deflection device in the opposite direction so that the interlocking between the steering element L and the coupling element B is re-established. The module is then ready for operation immediately. This type of modular exchange is particularly practical for modules with several steering elements, preferably more than two, more preferably more than five, most preferably more than ten.

The point of engagement D can advantageously be maintained stationary by pushing the drive element through the passage opening in a straight direction of advance/extension. A lateral displacement of the drive element (in longitudinal direction X or transverse direction Y) during the advance does not take place, so that a gap (preferably circular) between the drive element and the housing G in the passage opening N, which is necessary for operation, can be easily and well (preferably hermetically) sealed.

FIG. 1 shows that the module M comprises several steering elements L with steering sections A of different lengths. The steering elements L are pushed onto a common swivel axis W, which also extends in the longitudinal direction, with the length of their steering sections A ascending, as seen in the conveying direction $R_X$. At their free end facing away from the swivel axis W, the steering sections are each provided with a curved contour along which a product P moves in the event of contact and is deflected in the transverse direction Y in the process. Preferably, contours of directly adjacent steering sections are selected so that they merge into each other without any offset. This achieves a particularly gentle and low-impulse deflection of the products.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

The directions referenced herein and in the following claims, namely, the X or longitudinal direction, the Z or vertical direction, and the Y or transverse direction refer to the corresponding directions indicated in the drawings relative to the deflection device U as oriented therein. References to the bottom or underside of housing G are with reference to the orientation of housing G shown in the figures.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term). Rather than using an ordinal term to distinguish between commonly named elements, a particular one of a number of elements may be called out in the following claims as a "respective one" of the elements and thereafter referred to as "that respective one" of the elements.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

REFERENCE SYMBOLS

A Steering section
B Coupling element
D Point of engagement
E Conveyor plane
$F_1$, $F_2$ Tracks on conveyor plane E
G Housing
H Drive
K Drive element
L Steering element
M Modular assembly with the steering elements
N Passage opening
P Product
$R_Z$ Straight advance direction
$R_X$ Conveying direction
S Swivelling section of a steering element L
T Conveyor device
U Deflection device
W Swivel axis of a steering element L
X Longitudinal direction
Y Transverse direction
Z Vertical direction

The invention claimed is:

1. A deflection device for steering discrete products moving along a conveyor plane, the deflection device including:
   (a) a housing extending in a longitudinal direction, a transverse direction running orthogonally to the longitudinal direction, and a vertical direction running orthogonally to both the longitudinal direction and transverse direction when the deflection device is in an operating position;
   (b) at least two steering elements, each steering element being located outside of the housing and having a swivelling section formed about a swivel axis with a steering section connected to the swivelling section;

(c) a respective drive for each steering element, each drive being located in the housing and including a drive element that extends from the housing through a respective passage opening leading out of the housing, each drive element being movable by the respective drive along a respective straight drive element path through the respective passage opening; and (d) wherein each drive element is coupled outside of the housing to the swivel section of the respective steering element so that the respective steering element is operable to swivel about the swivel axis as the respective drive moves the respective drive element in an advancing movement of the respective drive element along its respective straight drive element path.

2. The deflection device of claim 1 wherein for each passage opening the housing is sealed at the respective passage opening independently of the position of the respective drive element extending through that respective passage opening and the position of the steering element to which the respective drive element is coupled.

3. The deflection device of claim 1 wherein that the housing is sealed at one passage opening by an annular seal acting between the housing and respective drive element extending through the one passage opening.

4. The deflection device of claim 1 wherein the passage openings are located in a side of the housing representing an underside of the housing when the deflection device is in the operating position.

5. The deflection device of claim 1 wherein the respective straight drive element path of two or more drive elements each run parallel to the vertical direction when the deflection device is in the operating position.

6. The deflection device of claim 1 wherein the respective swivel axis of two or more steering elements runs parallel to the longitudinal direction when the deflection device is in the operating position.

7. The deflection device of claim 1 wherein the respective straight drive element path of two or more drive elements runs orthogonally to the swivel axis of the respective steering elements.

8. The deflection device of claim 1 wherein two or more of the passage openings lie in a plane defined by the longitudinal direction and the transverse direction when the deflection device is in the operating position.

9. The deflection device of claim 1 wherein the swivel axis of each steering element is aligned along a common axis and each steering element is operable to swivel between a respective ready position about the common axis and a respective working position about the common axis.

10. The deflection device of claim 9 wherein the steering section of one of the steering elements extends in the vertical direction when that steering element is in the ready position and the deflection device is in the operating position.

11. The deflection device of claim 9 wherein the steering section of one of the steering elements extends in the transverse direction when that steering element is in the working position and the deflection device is in the operating position.

12. The deflection device of claim 1 wherein each drive element has, outside the housing, a respective coupling element coupled to the swivel section of the respective steering element at a respective point of engagement for transmitting movement of the respective drive element along the respective straight drive element path to the respective steering element and wherein the respective point of engagement maintains, during the advancing movement of the respective drive element, a constant position in at least one of (i) a vertical direction and (ii) a plane defined by the longitudinal direction and the transverse direction when the deflection device is in the operating position.

13. The deflection device of claim 12 wherein each coupling element has a toothed rack and the swivel element of the respective steering element has a toothed wheel profile formed about the swivel axis and operatively meshed with the toothed rack so that movement of the respective drive element along the straight drive element path moves the toothed rack so as to cause the swivel element of the respective steering element to swivel about its swivel axis.

14. The deflection device of claim 1 wherein each steering element is preloaded with a respective biasing force in a swivelling direction about its swivel axis.

15. The deflection device of claim 1 wherein the steering elements are mounted in an assembly that is detachable as a unit from the housing.

16. A conveyor system including:
(a) a conveyor device operable to convey a product in a track leading over a conveyor plane in a conveying direction;
(b) a deflection device including,
(i) a housing extending in a longitudinal direction, a transverse direction running orthogonally to the longitudinal direction, and a vertical direction running orthogonally to both the longitudinal direction and transverse direction when the deflection device is in an operating position relative to the conveyor plane;
(ii) at least two steering elements, each steering element belong located outside of the housing and having a swivelling section formed about a swivel axis with a steering section connected to the swivelling section;
(iii) a respective drive for each steering element, each drive being located in the housing and including a drive element that extends from the housing through a respective passage opening leading out of the housing, each drive element being movable by the respective drive along a respective straight drive element path through the respective passage opening; and
(iv) wherein each drive element is coupled outside of the housing to the swivel section of the respective steering element so that the respective steering element is operable to swivel about the swivel axis as the respective drive moves the respective drive element in an advancing movement of the respective drive element along its straight drive element path; and
(c) wherein the deflection device is located relative to the conveyor device so that at least one steering element is operable to be swivelled into the track of a conveyed product in order to deflect the product off of the track of the conveyed product by contact with the at least one steering element.

17. The conveyor system of claim 16 wherein the conveying direction is parallel to at least one of the swivel axis and the longitudinal direction.

18. The conveyor system of claim 16 wherein straight drive element path of at least one drive element is orthogonal to the conveyor plane.

19. The conveyor system of claim 16 wherein the passage openings lead out of an underside of the housing, the underside of the housing extending parallel to the conveyor plane.

20. The deflection device of claim 2 wherein for each passage opening the housing is sealed in accordance with one of DIN EN 60529 ingress protection ratings IP65, IP67, IP69, and IP69k.

* * * * *